United States Patent [19]
Colwell

[11] 4,144,078
[45] Mar. 13, 1979

[54] MASONRY CEMENT

[75] Inventor: Omar K. Colwell, Ocala, Fla.

[73] Assignee: Mid-Florida Mining Co., Lowell, Fla.

[21] Appl. No.: 877,869

[22] Filed: Feb. 15, 1978

Related U.S. Application Data

[63] Continuation-in-part of Ser. No. 692,356, Jun. 3, 1976, abandoned, which is a continuation of Ser. No. 520,167, Nov. 1, 1974, abandoned.

[51] Int. Cl.² .............................. C04B 7/02
[52] U.S. Cl. ........................ 106/97; 106/98
[58] Field of Search ................. 106/97, 98, 93

[56] References Cited

U.S. PATENT DOCUMENTS

| | | | |
|---|---|---|---|
| 2,083,961 | 6/1937 | New | 106/93 |
| 2,985,239 | 5/1961 | Shell | 106/93 |
| 4,043,827 | 8/1977 | Bernett | 106/98 |

*Primary Examiner*—James Poer
*Attorney, Agent, or Firm*—Littlepage, Quaintance, Murphy, Richardson and Webner

[57] ABSTRACT

A masonry mortar composition with performance parameters of water retention, plasticity and compressive strength greater than the ASTM standards, consisting essentially of Portland cements, aggregate, water and a calcium magnesium aluminum silicate which replaces the conventional hydrated lime. Preferred compositions are disclosed.

11 Claims, 1 Drawing Figure

MASONRY CEMENT

CROSS-REFERENCES TO RELATED APPLICATIONS

This application is a continuation-in-part of copending application Ser. No. 692,356 filed June 3, 1976 which, in turn, is a continuation of Ser. No. 520,167 filed Nov. 1, 1974, both now abandoned.

BACKGROUND OF THE INVENTION

This invention relates to an improvement in mortar composition suitable for masonry. Mortar, in ancient times, could be any kind of cementitious material used to bond building components together. Mud, clays, naturally occurring cement, etc. were used either alone or in a mixture. Mortar, today, suitable for unit masonry in the building trade must pass ASTM standards. In particular, ASTM standard C 270-68 is followed. While mortar is not defined by one specific composition in the industry it is generally recognized that masonry mortar consists of Portland cements, hydrated lime, and aggregates or masonry cement and aggregates which are mixed with water. The resultant mortar must have a specified water retention, i.e., greater than 70% and a compressive strength of 500 psi and 900 psi after 7 days and 28 days respectively. The cement, hydrated lime and aggregates must, in turn, each meet criteria which are defined by ASTM standards.

While it has long been recognized that hydrated lime is preferred in mortar mixtures containing Portland cement it has also been long known that the hydrated lime detracts substantially from the strength of the mortar.

Therefore, an object of the present invention is to produce a mortar containing Portland cement which does not contain hydrated lime and is able to pass the ASTM C 270-68 specification for mortar.

It is a further object of the invention to produce a mortar which upon curing has superior compressive strength, negligible expansion or contraction, and no distortion, cracking, checking, or pitting.

By the present invention it is possible to produce a mortar suitable for unit masonry which does not contain hydrated lime. This mortar passes all of the ASTM standards and, moreover, has superior workability, plasticity, and water retention. The present invention substitutes a fuller's earth type clay which has a plasticity greater than 700 and which is a calcium magnesium aluminum silicate. Preferably, the calcium magnesium aluminum silicate is a naturally occurring mineral found in Central Florida and known by the term Emathlite.

The ASTM C270-68 specification for mortar discusses various suitable cementitious materials. It should be noted that the ASTM C270-68 specification also provides standards for other types of cement designated Portland Pozzolan cement. Pozzolan is a broad descriptive term for any material which can combine with calcium oxide in the presence of water. While fuller's earth clay will fit this broad definition it is to be noted that Pozzolan cements are made by the inter-grinding of the Pozzolanic material and the Portland cement clinker. Commercially, the typical Pozzolan cement is one in which the Pozzolanic material is fly ash.

The present invention embodies the use of Portland cement combined with Emathlite, a calcium magnesium aluminum silicate, as a substitute for hydrated lime, to form a masonry cement as specified in ASTM C 91. The resultant masonry cement will meet all requirements for masonry mortar as specified in ASTM C 270-68.

The ASTM C 270-68 specification provides that the mortar is mixed to an initial flow of 100 to 115 and shall have a flow after suction of not less than 70%. The compressive strength, properly measured, shall be 500 psi after 7 days and 900 psi after 28 days.

In regard to the other terms used in the ASTM C-270-68 specification, the term hydrated lime or lime is intended to indicate material which satisfy the standard specifications for hydrated lime found in ASTM designation C 207. The lime must have a plasticity value over 200 and a water retention not less than 75%. In each instance, the term Portland cement is intended to indicate a Portland cement satisfying the specification for Portland cement found in ASTM designation C 150 and Portland blast-furnace slag cement as found in ASTM designation C 595. In each instance, the term aggregate is intended to indicate a convenient mixture of natural sand, crushed stone or gravel which is clean, chemically inert, and substantially free of organic matter. Size limitations may be placed upon the individual particles making up the aggregate, depending upon the specifications for the mortar to be used on a particular project.

By plasticity is meant that the mortar or cement can be molded, altered or otherwise deformed without rupturing or losing cohesive structure.

By water retention is meant a resistance to suction from the dry surface to which a masonry mortar is applied. All mortar when used for bonding masonry units, plaster or stucco is subjected to a suction from the dry surfaces to which it is applied. If a mortar has insufficient water retention, such a suction could rapidly remove the water from the applied mortar. Too rapid a loss of water results in the hydration period of the cements not being completed thus reducing the strength of resulting structure. Additionally, workability time is reduced thus preventing proper placement of masonry units. The too rapid loss of water results in a loss of suction which in turn results in poor bonding and cracking.

If a mortar is made from materials which provide for sufficient water retention, the suction from the dry surfaces to which it is applied will not remove the water from the mortar to any appreciable extent. In this way sufficient time is provided for proper placement of masonry units and subsequent hydration of the cements to achieve maximum strength.

Calcium magnesium aluminum silicate is a fuller's earth type clay well known for its sorptive properties. It includes highly porous montmorillonites, attapulgites, sepiolites, palygorskites, and opalites to define its geological origin. The fuller's earth is highly absorbant and when used in the present invention must form a mortar which has a water retention of greater than 70%. Additionally the fuller's earth must have a plasticity greater than 700.

These clays and clay mixtures typically contain by weight 30–70% silicon dioxide, 3–20% aluminum oxide, 3–9% calcium oxide, 1–8% magnesium oxide and 1–20% of other oxides such as iron oxides, sodium, potassium and lithium oxide, titanium oxide, sulfur oxide and 2–15% water. The physical properties of the clay, particularly, high water retention and plasticity are critical parameters which make it possible to substitute the calcium magnesium aluminum silicate for hydrated lime. The exact chemical analysis is of lesser significance and mixtures of fuller earth type clays can be made which have the desired water retention and plasticity. The chemical analysis of mixed fuller's earth clays in the present invention generally is by weight percent 50–70% silicon dioxide, 7–16% aluminum oxide, 3–9% calcium oxide, 1–7% magnesium oxide, other oxides 1–10% and water 1–10%.

A preferred fuller's earth type clay is one known as Emathlite. The chemical composition for Emathlite is is shown in Table I. Emathlite is commercially available from Mid-Florida Mining Company.

TABLE I

| Chemical Analysis | | |
|---|---|---|
| | Generally | Typically |
| Silicon Dioxide | 60–70 | 66.8 |
| Aluminum Oxide | 9–15 | 11.5 |
| Calcium Oxide | 3–9 | 6.1 |
| Magnesium Oxide | 2–5 | 3.0 |
| Iron Oxide | 1–6 | 2.9 |
| Sulfur Oxide | .03–2 | .1 |
| Potassium Oxide | 1–4 | 1.3 |
| Titanium Dioxide | 0.1–2 | 0.3 |
| Sodium Oxide | 0.1–2 | 0.2 |
| Ignition loss at 1220° C | 2–9% | 5.8 |

In many ways Emathlite is an unusual material even among clays and fuller's earth materials. The Emathlite has a very high water retention, commonly 75 to 95%. Even more remarkable, the Emathlite can have plasticity value of more than 900. These properties are not associated with Pozzolanic materials in general and particularly contrast with the common construction Pozzolanic material, fly ash, which typically has a water retention of about 50% and a plasticity value of about 110.

The typical physical properties for Emathlite are summarized in Table II.

TABLE II

| Typical Physical Properties | |
|---|---|
| pH | 4.4–4.9 |
| Specific Gravity | 2.40 |
| Free Moisture, % | 4–6 |
| Plasticity | 700–950 |
| Surface Area, m$^2$/g | 700 |
| Bulk Density, lbs./ft.$^3$ | 32–38 |

SUMMARY OF THE INVENTION

The masonry mortar, which passes ASTM 270-68 standard is made by mixing Portland cement and in place of hydrated lime, a calcium magnesium aluminum silicate which has a plasticity greater than 700 in a ratio between 3:7 and 4:6 by weight with sufficient aggregate and water to achieve the desired consistency. The mortar has a water retention greater than 70%. The preferred ratio between the calcium magnesium aluminum silicate and Portland cement is approximately 0.53:1. The calcium magnesium aluminum silicate functions as a complete substitute for hydrated lime. The preferred calcium magnesium aluminum silicate is one known by the term Emathlite. The resulting mortar has a superior plasticity, workability, and strength when compared to a mortar including hydrated lime.

A mortar satisfying the standard specifications for masonry cement found in ASTM designation C270-68 and tested by ASTM C91-71 can be formed from a mixture of calcium magnesium aluminum silicate and Portland cement in a ratio between 3:7 and 4:6 by weight, aggregate in an amount between 65 and 80 weight percent based on the sum of the aggregate, Portland cement and calcium magnesium aluminum silicate and, sufficient water to achieve the desired consistency. A typical formulation would be calcium magnesium aluminum silicate with a plasticity value greater than 700, Portland cement, and fine aggregate in a ratio 8:15:77 by weight. If Emathlite is used, such a formulation would provide a material having a compressive strength in excess of 1,600 psi after 28 days with a water retention of 90% or greater.

DESCRIPTION OF THE PREFERRED EMBODIMENTS

EXAMPLE 1

Figure 1:
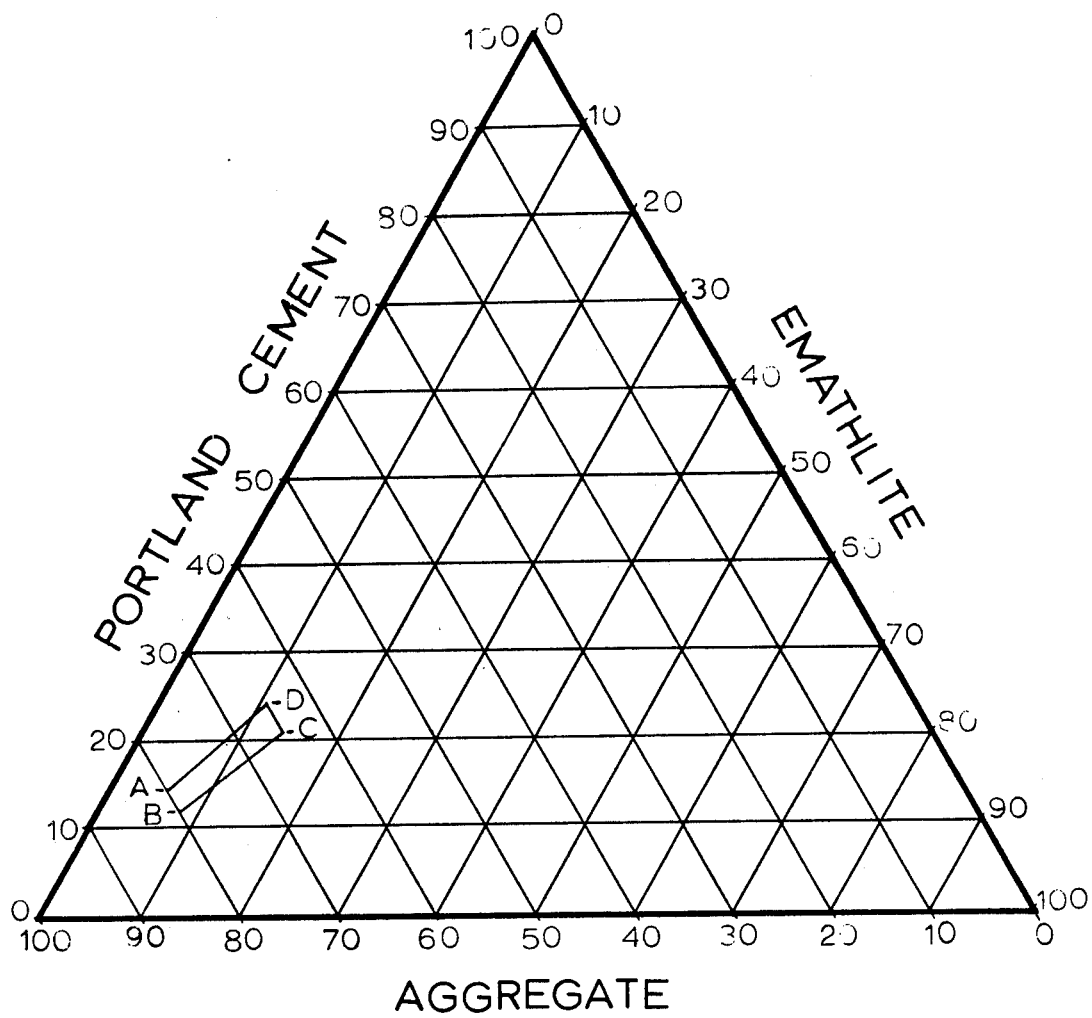
FIG. 1 is a ternary diagram of the relation between the Portland cement, the calcium magnesium aluminum silicate, preferably Emathlite, and fine aggregate in a mortar according to this invention.

A blend of Type I Portland cement and Emathlite in the ratio of 424:226 was tested for fineness, soundness and time of setting. A mortar was then prepared with 390 grams of the blended Portland cement and Emathlite, 720 grams of graded Ottawa sand and 720 grams of 20–30 Ottawa sand with sufficient water to produce a flow of 110 ± 5. This mortar was then tested for compressive strength and water retention. The results of these tests together with the ASTM requirements for masonry cement are to be found in Table III.

TABLE III

| | Test | Test Result | ASTM C 91-71 Requirements For Masonry Cement |
|---|---|---|---|
| A. | Fineness, Residue on No. 325 sieve, percent | 6.8 | 24 Maximum |
| B. | Soundness, Autoclave Expansion, percent | −0.08 | + 1.0 Maximum |
| C. | Time of Setting, Gillmore Method | | |
| | Initial Set, hours | 5.25 | 2 Minimum |
| | Final Set, hours | 16 | 24 Maximum |
| D. | Compressive Strength, average of 3 cubes | | |
| | 7 Days, psi | 630 | 500 Minimum |
| | 28 Days, psi | 1710 | 900 Minimum |
| E. | Water Retention, flow after suction, percent | 83 | 70 Minimum |

EXAMPLE 2

A mortar was made of Emathlite, Portland cement, and fine aggregate in the ratio of 8:15:77, and sufficient water to achieve a flow of 110 ± 5. The mortar had a compressive strength after 7 days of 570 psi and after 28 days of 1,610 psi. The mortar had a water retention of 90%.

Mortars have been produced which satisfy the ASTM standards having the proportions of Emathlite, Portland cement, and fine aggregate shown in Table IV.

TABLE IV

| | Mortar Proportions by Weight for Figure 1 | | |
|---|---|---|---|
| Point | Emathlite | Portland Cement | Fine Aggregate |
| A | 6 | 14 | 80 |
| B | 8 | 12 | 80 |
| C | 14 | 21 | 65 |
| D | 10.5 | 24.5 | 65 |

Each of the points, A, B, C, and D, are shown on FIG. 1. It is believed that a satisfactory mortar can be made having a ratio of Emathlite, Portland cement, and fine aggregate defined by any point within the rectangular area A, B, C, D, of FIG. 1 and sufficient water to obtain a desirable consistency. A particularly satisfactory mortar can be obtained by mixing 130 parts by weight of Portland cement, 70 parts by weight Emathlite and 450–600 parts by weight fine aggregate together with sufficient water to obtain the proper consistency.

EXAMPLES 3 and 4

These examples are illustrative of the present invention. A mortar composition is made by mixing in a conventional manner the components shown in Table V. All parts are by weight. The mortar was tested for compressive strength and water retention according to ASTM C91-71; the requirements noted in Table III. The mortar so achieved by Examples 3 and 4 had very high water retention and achieved very high compressive strengths after 56 days. These strengths were far greater than the conventional Portland cement, hydrated lime/sand mortar which is shown in Example 5.

TABLE V

| MATERIAL | EX3 (I)$^a$ (gms) | EX4 (I) (gms) | EX5 (C)$^b$ (gms) | EX6 (C) (gms) |
|---|---|---|---|---|
| TYPE 1 Portland Cement | 853 | 853 | 853 | 853 |
| Masonry Sand | 4744 | 4744 | 4744 | 4744 |
| Water Reducing Agent | 3 | 3 | 3 | 3 |
| Emathlite (45% minus 325 sieve) | 400 | — | — | — |
| Emathlite (VMP 3000$^+$) | — | 400 | — | — |
| Hydrated Lime | — | — | 400 | — |
| Fly ash | — | — | — | 400 |
| Water Retention | 90 | 85 | 86 | 69 |
| Compressive Strength psi | | | | |
| after 7 days | 580 | 605 | 1330 | — |
| after 28 days | 1650 | 1670 | 1720 | — |
| after 56 days | 1930 | 2150 | 1810 | — |

$^a$I=inventive
$^b$C=comparative

EXAMPLE 5

This example is not illustrative of the present invention. This example shows the composition and test results of conventional mortar using hydrated lime following the procedure of Examples 3 and 4.

EXAMPLE 6

This example is not illustrative of the present invention. The example illustrates an unsuccessful attempt to make a satisfactory mortar employing Portland cement, sand and a common pozzolanic material, flyash. Compressive strengths were not measured for the material failed the water retention requirements and therefore could not meet the ASTM standards.

Although the invention has been described in considerable detail with reference to certain preferred embodiments thereof, it will be understood that variations and modifications can be effected within the spirit and scope of the invention as described above and as defined in the appended claims.

What is claimed is:

1. In a masonry mortar composition consisting essentially in the dry state of Portland cement and aggregate present in amounts sufficient to form a conventional mortar composition, the improvement consisting of the inclusion in the composition of a calcium magnesium aluminum silicate having a plasticity value greater than 700, said calcium magnesium aluminum silicate present in a ratio between 3:7 and 4:6 by weight to Portland cement, the ratio of Portland cement to fine aggregate being between 1:4 and 3:20 by weight and the composition having a water retention greater than 75% when sufficient water is added to obtain a flow of 110 ± 5.

2. In a masonry mortar composition consisting essentially in the dry state of Portland cement and aggregate present in amounts sufficient to form a conventional mortar composition, the improvement consisting of the inclusion in the composition of a calcium magnesium aluminum silicate with an analysis of
   silicon dioxide: 50–70
   aluminum oxide: 7–16
   calcium oxide: 3–9
   magnesium oxide: 1–7
   other oxides: 1–10, by weight percent,
said hydrated calcium magnesium aluminum silicate present in a ratio between 3:7 and 4:6 by weight of the silicate to Portland cement, the ratio of Portland cement to fine aggregate being between 1:4 and 3:20 by weight and the composition having a water retention greater than 75% when sufficient water is added to obtain a flow of 110 ± 5.

3. The mortar of claim 1 wherein the ratio of calcium magnesium aluminum silicate to Portland cement is approximately 0.53:1 by weight.

4. The mortar of claim 1 wherein the calcium magnesium aluminum silicate consists essentially of a composition with the following chemical analysis:
   Silicon Dioxide: 60–70
   Aluminum Oxide: 9–15
   Calcium Oxide: 3–9
   Magnesium Oxide: 2–5
   Iron Oxide: 1–6
   Sulfur Oxide: 0.03–2
   Potassium Oxide: 1–4
   Titanium Dioxide: 0.1–2
   Sodium Oxide: 0.1–2.

5. The mortar of claim 1 wherein the aggregate is in an amount between 65 and 80 weight percent based on the weight of the total composition.

6. A masonry mortar of claim 2 wherein the calcium magnesium aluminum silicate has a plasticity greater than 700.

7. A masonry mortar composition having a water retention greater than 75% consisting essentially of
   A. a calcium magnesium aluminum silicate with an analysis by weight percent of:
      silicon dioxide: 50–70%
      aluminum oxide: 7–16%
      calcium oxide: 3–9%
      magnesium oxide: 1–7%
      other oxides: 1–10%
      and a plasticity value greater than 700,
   B. Portland cement;
   C. fine aggregate; and
   D. water, the ratio of B:A being between 7:3 and 6:4 by weight, the ratio of B:C being between 1:4 and 3:20 and the water being sufficient to obtain a flow of 110 ± 5.

8. A masonry mortar of claim 7 wherein A consists essentially of a composition with the following chemical analysis:
   Silicon Dioxide: 60–70
   Aluminum Oxide: 9–15
   Calcium Oxide: 3–9
   Magnesium Oxide: 2–5
   Iron Oxide: 1–6
   Sulfur Oxide: 0.03–2
   Potassium Oxide: 1–4
   Titanium Dioxide: 0.1–2

Sodium Oxide: 0.1–2.

9. A masonry mortar of claim 6 wherein A has a plasticity value greater than 900.

10. A process for producing an ASTM C 270-68 masonry mortar comprising substituting a calcium magnesium aluminum silicate consisting essentially of a composition of the following chemical analysis:

Silicon Dioxide: 60–70
Aluminum Oxide: 9–15
Calcium Oxide: 3–9
Magnesium Oxide: 2–5
Iron Oxide: 1–6
Sulfur Oxide: 0.03–2
Potassium Oxide: 1–4
Titanium Dioxide: 0.1–2
Sodium Oxide: 0.1–2 for hydrated lime in the conventional mortar mix consisting essentially of aggregate, Portland cement and hydrated lime wherein the weight ratio of calcium magnesium aluminum silicate to Portland cement is between 3:7 and 4:6 and the weight ratio of Portland cement to fine aggregate being 1:4 and 3:20.

11. A masonry mortar of claim 8 wherein the calcium, magnesium, aluminum silicate, Portland cement and aggregate are in the ratio of 8:15:77 by weight.

* * * * *